(12) United States Patent
Jeong et al.

(10) Patent No.: US 6,684,011 B2
(45) Date of Patent: Jan. 27, 2004

(54) SPOT SIZE CONVERTER AND METHOD OF MANUFACTURING THE SAME

(75) Inventors: Jong Sool Jeong, Daejon (KR); Yong Soon Baek, Daejon (KR); Kwang Ryong Oh, Daejon (KR)

(73) Assignee: Electronics and Telecommunications Research Institute, Daejon (KR)

( * ) Notice: Subject to any disclaimer, the term of this patent is extended or adjusted under 35 U.S.C. 154(b) by 318 days.

(21) Appl. No.: 09/948,555

(22) Filed: Sep. 10, 2001

(65) Prior Publication Data

US 2002/0039469 A1 Apr. 4, 2002

(30) Foreign Application Priority Data

Oct. 2, 2000 (KR) ........................................ 2000-57827

(51) Int. Cl.[7] ................................................. G02B 6/26
(52) U.S. Cl. ........................................... 385/43; 385/50
(58) Field of Search ............................. 385/15, 39, 43, 385/50, 129, 131

(56) References Cited

U.S. PATENT DOCUMENTS

| | | | |
|---|---|---|---|
| 5,657,338 A | | 8/1997 | Kitamura |
| 5,720,893 A | | 2/1998 | Ben-Michael et al. |
| 6,253,009 B1 | * | 6/2001 | Lestra et al. .................. 385/50 |
| 6,383,829 B1 | * | 5/2002 | Sakata ......................... 438/31 |
| 6,614,951 B2 | * | 9/2003 | Lin .............................. 385/15 |

* cited by examiner

Primary Examiner—Khiem Nguyen
(74) Attorney, Agent, or Firm—Jacobson Holman PLLC (57) ABSTRACT

The present invention relates to a spot size converter and a method of fabricating the same, which provides efficient coupling between an optical fiber and integrated devices of optical waveguide. The spot size converter has an input and output optical waveguides formed in a vertical double-layer structure. Integrated to the output optical waveguide, an unidirectional side-tapered optical waveguide is formed. Due to the tapered structure of the optical waveguide, the effective refective index gradually changes along the length of the waveguide. Thus, the spot size of the optical signal gradually changes while the optical signal travels within the tapered optical waveguide. Therefore, the present invention effectively eliminates or minimizes the coupling loss and the reflection loss between the optical fiber and the devices connected to the spot size converter. In particular, the present invention provides method for easily fabricating a tapered and narrow optical waveguide structure using low-resolution photolithography technique and reducing the manufacturing cost and increasing the manufacturing yield at the same time.

11 Claims, 9 Drawing Sheets

SPOT SIZE CONVERTER AND METHOD OF MANUFACTURING THE SAME

TECHNICAL FIELD

The invention relates generally to a spot size converter for coupling an optical fiber and optical waveguide integrated devices, and a method of fabricating the same. More particularly, the invention relates to a spot size converter capable of significantly reducing the coupling loss and the reflection loss between an optical fiber and optical waveguide integrated devices, and a method of fabricating the same.

BACKGROUND OF THE INVENTION

Conventional technologies relating to a method of fabricating this type of spot size converter typically use well-known butt-joint integration method.

The butt-joint integration method is an integration technology which positions an active-type optical waveguide and a passive-type optical waveguide on the same plane and connects of the cross sections of the two optical waveguides. This method is described in an article of E. Gaumont, "Butt coupling process for InP based photonic integrated circuit," Proc. 8th Int. Conf. of InP and related materials, p256. The above integration technology has an advantage in that it achieves a high integration degree since two optical waveguides are positioned at the same layer and it does not require a tapered structure. As the technology directly couples an active-type optical waveguide and a passive-type optical waveguide, however, there is a disadvantage that scattering loss and reflection problem tend to occur due to defects at the cross-section boundary.

In order to solve the problem of scattering loss and the reflection problem at the boundary of the butt-joint integration method, a double-layer optical waveguide integration method has recently been proposed. The double-layer optical waveguide integration method is described in an article of J. Y. Emery, "High performance 1.55 µm polarization-insensitive semiconductor optical amplifier based on low-tensile-strained bulk InGaAsP," Electronics Letters, Vol.33, p1038, 1997. The double-layer optical waveguide integration method vertically positions a passive-type optical waveguide and an active-type optical waveguide but requires a high degree of precision and repeatability in the fabricating process.

SUMMARY OF THE INVENTION

It is therefore an object of the present invention to provide a spot size converter which has a low coupling loss and reflection loss and a method for fabricating such spot size converter with ease and at a low manufacturing cost.

In order to accomplish the above object, the present invention provides a spot size converter for converting the spot size of input optical signal received from an input optical fiber and outputting the converted optical signal, said spot size converter comprising an input optical waveguide formed on a semiconductor substrate and connected to the input optical fiber to receive input optical signal; an output optical waveguide formed on the input optical waveguide to form a double-layer structure with the input optical waveguide on the semiconductor substrate and to output the optical signal after converting the spot size of the optical signal; and a unidirectional side-tapered optical waveguide formed in the same layer as the output optical waveguide and integrated to one side of the output optical waveguide facing the input optical fiber, and having a shape tapered in one side along a given length in the longitudinal direction of the output optical waveguide, wherein the spot size of the input optical signal transferred to said unidirectional side-tapered optical waveguide is gradually converted while the optical signal travels through the unidirectional side-tapered optical waveguide toward the output optical waveguide due to the continuous change in the effective reflective index.

In another aspect of the invention, the invention provides a method of fabricating a spot size converter comprising the steps of sequentially forming a first semiconductor layer for forming an input optical waveguide, and a second semiconductor layer for forming a unidirectional side-tapered optical waveguide and an output optical waveguide on a semiconductor substrate; etching the second semiconductor layer so that the width of said second semiconductor layer corresponds to a desired width of the input optical waveguide; forming a mask on said second semiconductor layer, the mask having a width corresponding to a desired width of the output optical waveguide and having a tapered portion on one end, the tapered portion having a shape one side of which is tapered along a given length in the longitudinal direction of said output optical waveguide to correspond to a desired shape of the unidirectional side-tapered optical waveguide; and respectively etching the second semiconductor layer and the first semiconductor layer using the mask and the second semiconductor layer as a mask.

BRIEF DESCRIPTION OF THE DRAWINGS

The aforementioned aspects and other features of the present invention will be explained in the following description, taken in conjunction with the accompanying drawings, wherein.

DETAILED DESCRIPTION OF THE INVENTION

The present invention will be described in detail by way of a preferred embodiment with reference to accompanying drawings, in which like reference numerals are used to identify the same or similar parts.

Figure 1:
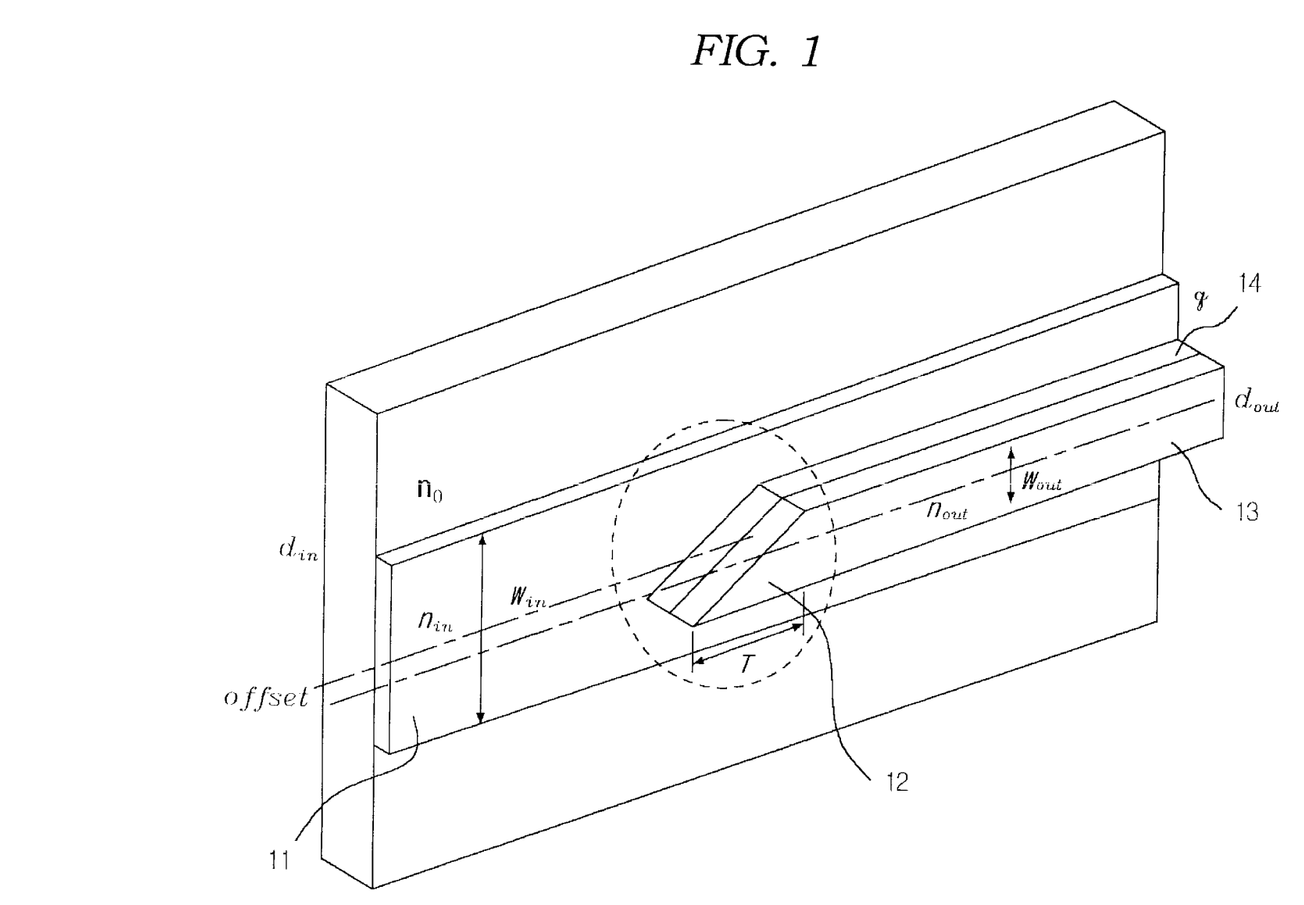
FIG. 1 is a 3D structure of a spot size converter according to one embodiment of the present invention.

FIG. 1 is a 3D structure of a spot size converter according to one embodiment of the present invention. The spot size converter has a vertical double-layer structure which includes an input optical waveguide 11 to which optical signals are inputted from an input optical fiber, output optical waveguide 13 for outputting the optical signals of converted spot size to output optical waveguide integrated devices, and a space region 14 located between the input optical waveguide 11 and the out optical waveguide 13. These layers are formed on a semiconductor substrate 1 made of InP. Also, the spot size converter includes a unidirectional side-tapered optical waveguide 12 tapered only in one direction along which light travels. The unidirectional side-tapered optical waveguide 12 is formed on the same layer where the output optical waveguide 13 is formed and integrated with the output optical waveguide 13. The width of the unidirectional side-tapered optical waveguide 12 facing with the input optical waveguide 11 becomes gradually wider along the direction of light travel. Thus, the unidirectional side-tapered optical waveguide 12 gradually changes the spot size of the optical signals from the input optical waveguide 11 and provides it to the output optical waveguide 13.

In a preferred embodiment of the spot size converter according to the present invention shown in FIG. 1, the widths ($w_{in}$, $w_{out}$) of the input and output optical waveguides are 3.0 μm and 1.2 μm, respectively. The thickness ($d_{in}$, $d_{out}$) of the input and output optical waveguides are 0.15 μm and 0.4 μm, respectively. The distance (g) between the input optical waveguide and the output optical waveguide, that is, the thickness of the spacer layer 14 is 0.3 μm. Passive-type and active-type reflective indices ($n_{in}$, $n_{out}$) are 3.28 and 3.4, respectively. Also, the clad reflective index ($n_0$) is 3.17.

In FIG. 1, the tapered length in the longitudinal direction of the unidirectional side-tapered optical waveguide 12 is indicated as T, and the offset between the input and output optical waveguides is also illustrated. The principle of the operation of the spot size converter according to the present invention having the above mentioned structure is explained below.

As can be seen from FIG. 1, the light outputted from the optical fiber is inputted only through the input optical waveguide 11. Therefore, the optical signals provided to the input optical waveguide 11 from the input optical fiber propagate within the input optical waveguide 11 having a spot size similar to the spot size of the optical fiber. The optical signal passing through the input optical waveguide 11 is adiabatically transferred to the unidirectional side-tapered optical waveguide 12 connected to the input optical waveguide 11.

At this time, as the unidirectional side-tapered optical waveguide 12 has a shape tapered only in the direction along which light travels, as shown in FIG. 1, the effective reflective index is changed gradually and continuously. Thus, the optical signal is not reflected at the interface between the input optical waveguide 11 and the side-tapered optical waveguide 12. Due to this, the reflection loss becomes very small and the coupling efficiency characteristic becomes high at the same time.

The spot size of the optical signals transferred to the unidirectional side-tapered optical waveguide 12 is continuously and gradually changed due to the characteristic of the unidirectional side-tapered optical waveguide 12. The optical signals having converted spot size is coupled to the output optical waveguide 13 having a higher reflective index since light has a basic property of propagating into a medium having a higher reflective index. The coupled optical signals are outputted to the optical waveguide integrated devices through the output optical waveguide 13. In other words, the spot size of the optical signals inputted to the input optical waveguide through the input side optical fiber gradually and continuously changes by the unidirectional side-tapered optical waveguide. Then, the optical signals are outputted to the output optical waveguide integrated devices via the output optical waveguide.

A method of fabricating the spot size converter having these characteristics will is explained below.

First, a first semiconductor layer for forming an input optical waveguide and a second semiconductor layer for forming a unidirectional side-tapered optical waveguide and an output optical waveguide are sequentially formed on a semiconductor substrate. The semiconductor layers are etched so that the width of the second semiconductor layer is matched to the width of the input optical waveguide. Next, a mask having a width same as the width of the output optical waveguide and having a shape tapered over a given length along one direction is formed on the second semiconductor layer for forming the tapered structure of the unidirectional side-tapered optical waveguide. Thereafter, the first semiconductor layer and the second semiconductor layer are sequentially etched using the mask and the second semiconductor layer.

Optionally, a clad layer surrounding the semiconductor layers excluding the portions where the optical signals are inputted or outputted is grown on the semiconductor substrate.

FIGS. 2–7 is a diagram illustrating the process of fabricating a spot size converter according to one embodiment of the present invention. Referring now to the drawings, a method of fabricating a spot size converter according to the present invention will be described in detail.

Figure 2:
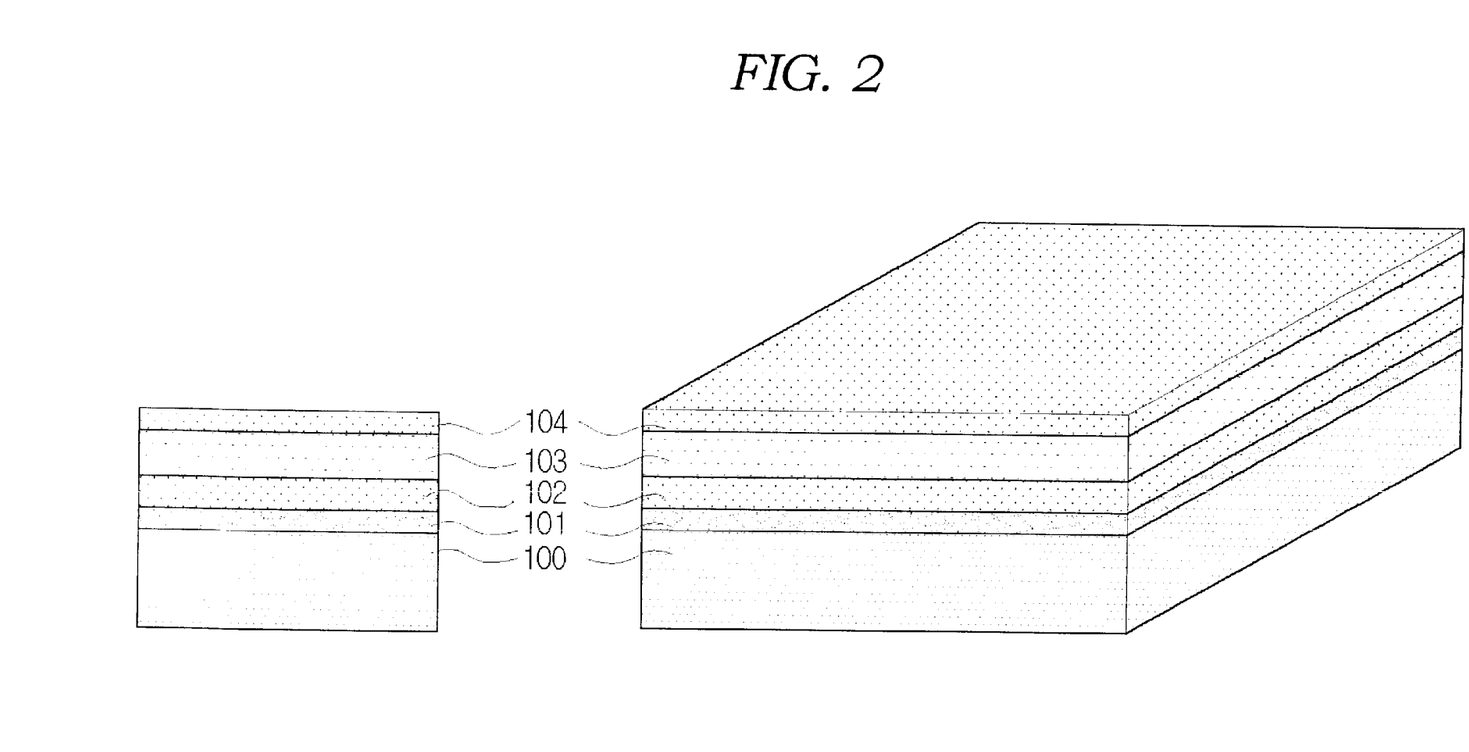
FIG. 2 illustrates a growth layer structure for fabricating a spot size converter according to the present invention.

Referring to FIG. 2, in a first step, an InGaAsP (Q=1.18) layer 101 for forming an input optical waveguide, a spacer layer 102 having has a lower reflective index than the input/output optical waveguides and made of InP having selective etching characteristic, an InGaAsP (Q=1.3) layer 103 for forming an output optical waveguide and a cap layer 104 made of InP are sequentially formed on a semiconductor substrate 100 made of InP.

Figure 3:
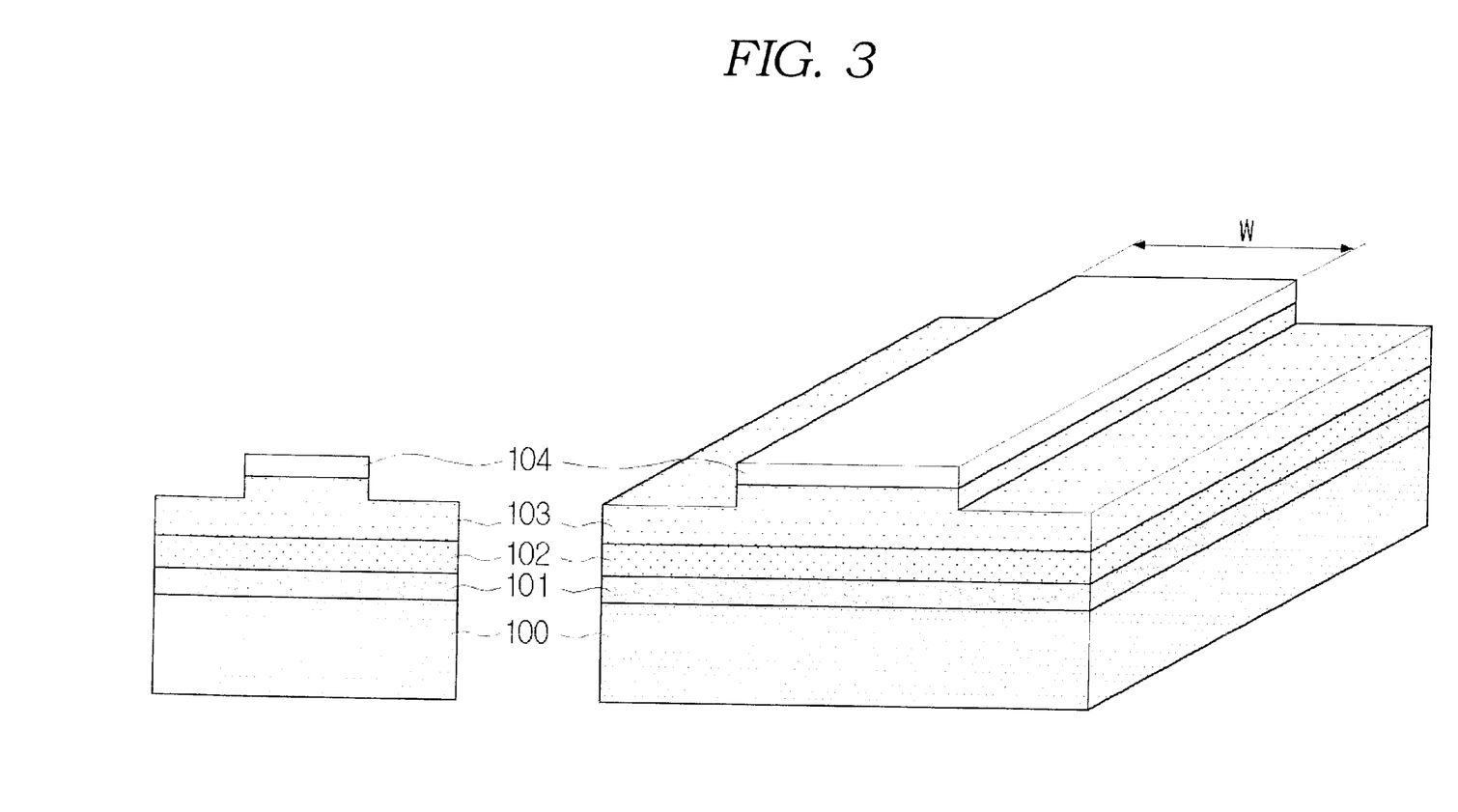
FIG. 3 illustrates a process of fabricating an input optical waveguide of a spot size converter according to the present invention.

Referring to FIG. 3, in a second step, the InGaAsP layer 103 and the cap layer 104 are partially etched by means of reactive ion etching (RIE) process leaving unetched central portion having a width corresponding to the width of the input optical waveguide 11. In the second step, it is preferred that the width (W) of the unetched central portion of the InGaAsP layer 103, which corresponds to the width of the input optical waveguide 11, is at least 3.0 μm.

Figure 4:
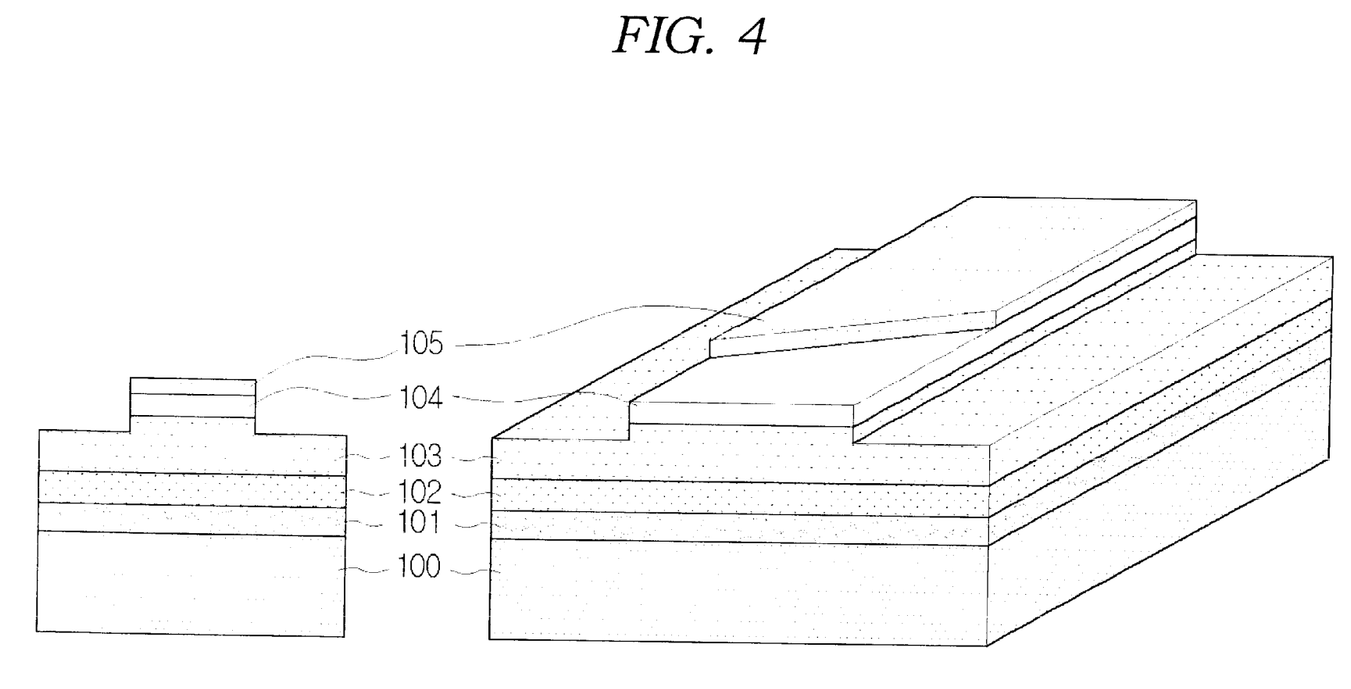
FIG. 4 illustrates a process of forming a first mask for fabricating a unidirectional side-tapered optical waveguide.

Referring now to FIG. 4, in a third step, a first mask 105 made of SiNx is formed on the cap layer 104 etched by RIE in the second step. The first mask is formed to have a shape only one side of which is tapered, as shown in FIG. 4. The tapered shape of the first mask corresponds to the tapered structure of the unidirectional side-tapered optical waveguide to be formed in the subsequent processes. Meanwhile, the first mask is patterned by removing SiNx material from the area outside of the tapered shape by means of dry etch process using magnetic enhanced reactive ion etching (MERIE).

Figure 5:
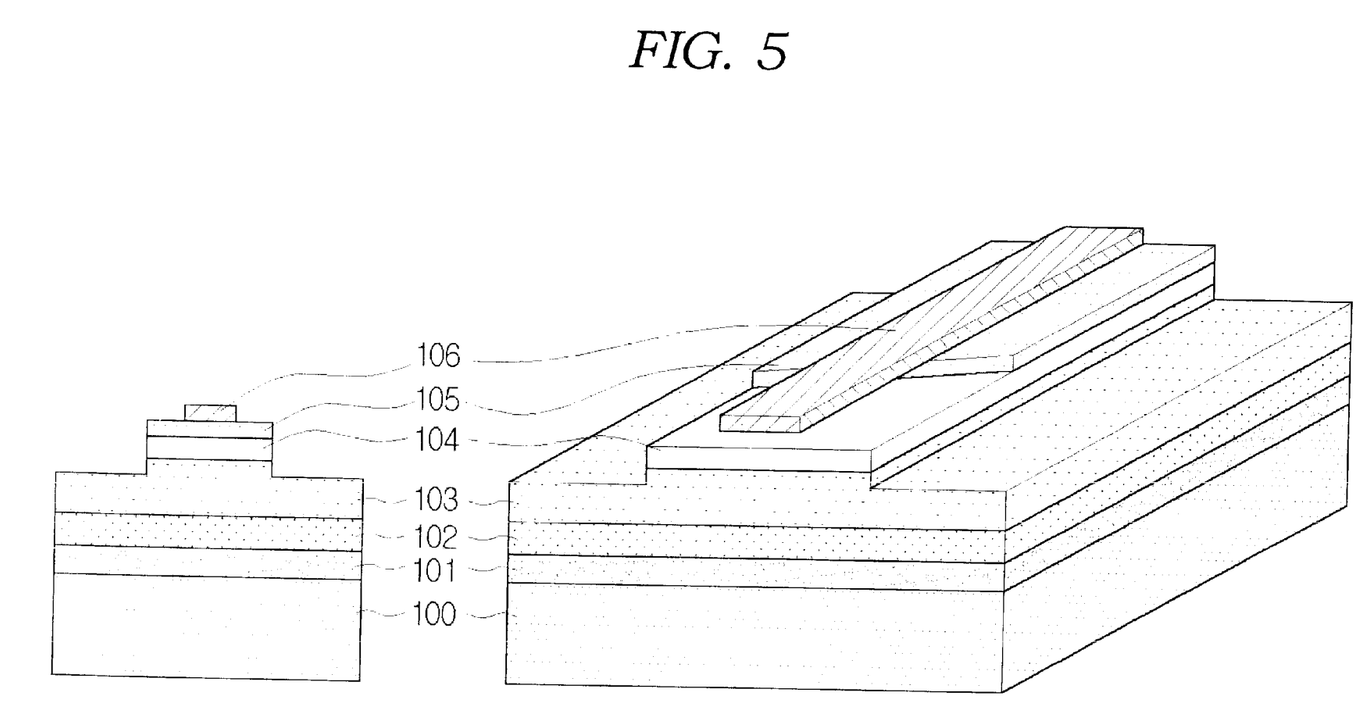
FIG. 5 illustrates a process of forming a second mask for fabricating a unidirectional side-tapered optical waveguide.

Next, as shown in FIG. 5, a second mask 106 having a shape of a rectangular straight-line and having a width corresponding to the width of the output optical waveguide is formed on the first mask 105. Meanwhile, the SiNx material formed outside of the second mask 106 area is removed by dry etching process using MERIE.

Wet etching is a process by which a wafer is chemically etched by means of etching solution. On the other hand, dry etching is a process in which a wafer is exposed to the plasma of reactive gas and the wafer is etched by the plasma ions bombarding the surface of the wafer with high energy.

Figure 6:
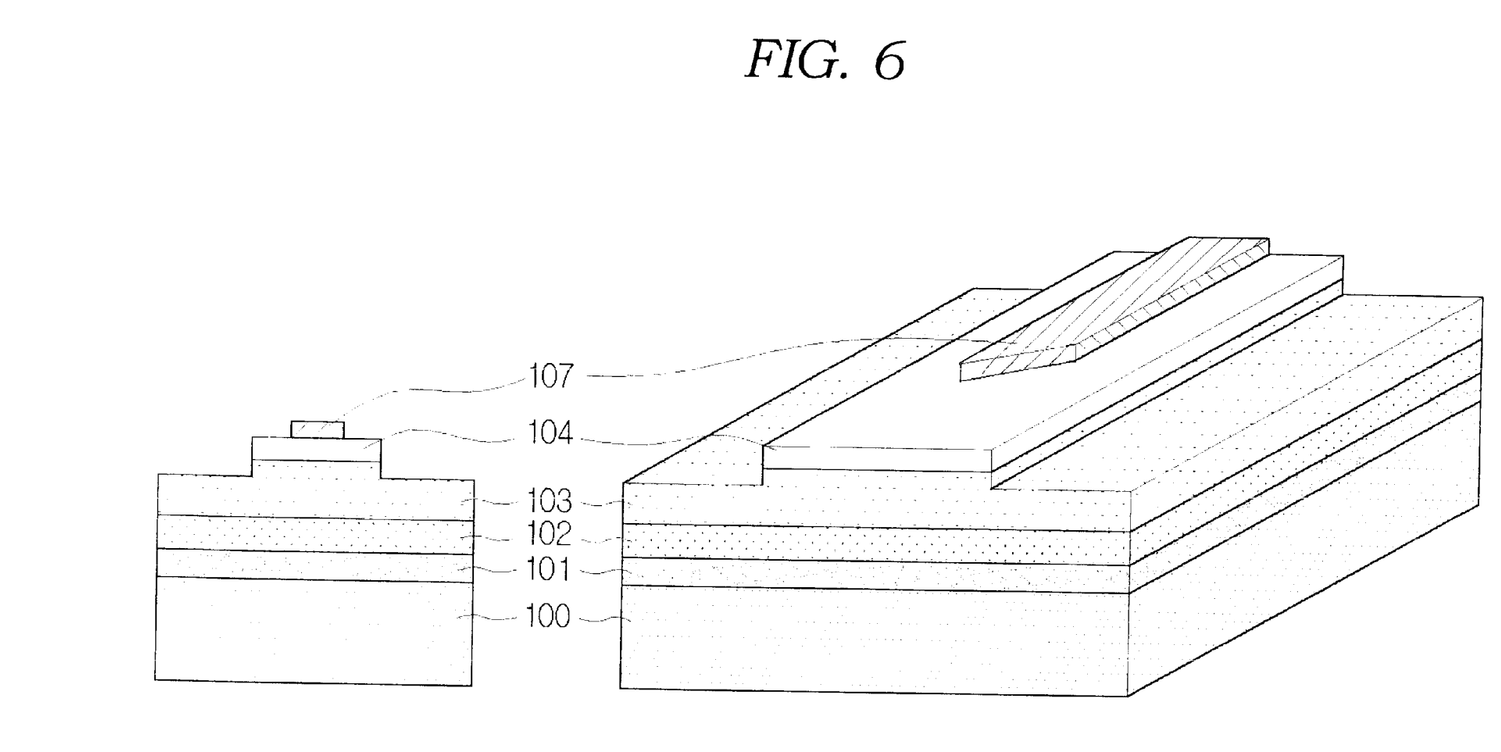
FIG. 6 illustrates a process of fabricating a spot size converter using the first and second masks.

Referring now to FIG. 6, the first mask 105 is etched using the second mask 106 to form a mask 107 having a very narrow width of about several tens of Å. For the etching of the first mask, it is preferred that a low-resolution photolithography process is first performed using the second mask 106 and then a dry etching process is performed using MERIE.

Figure 7:
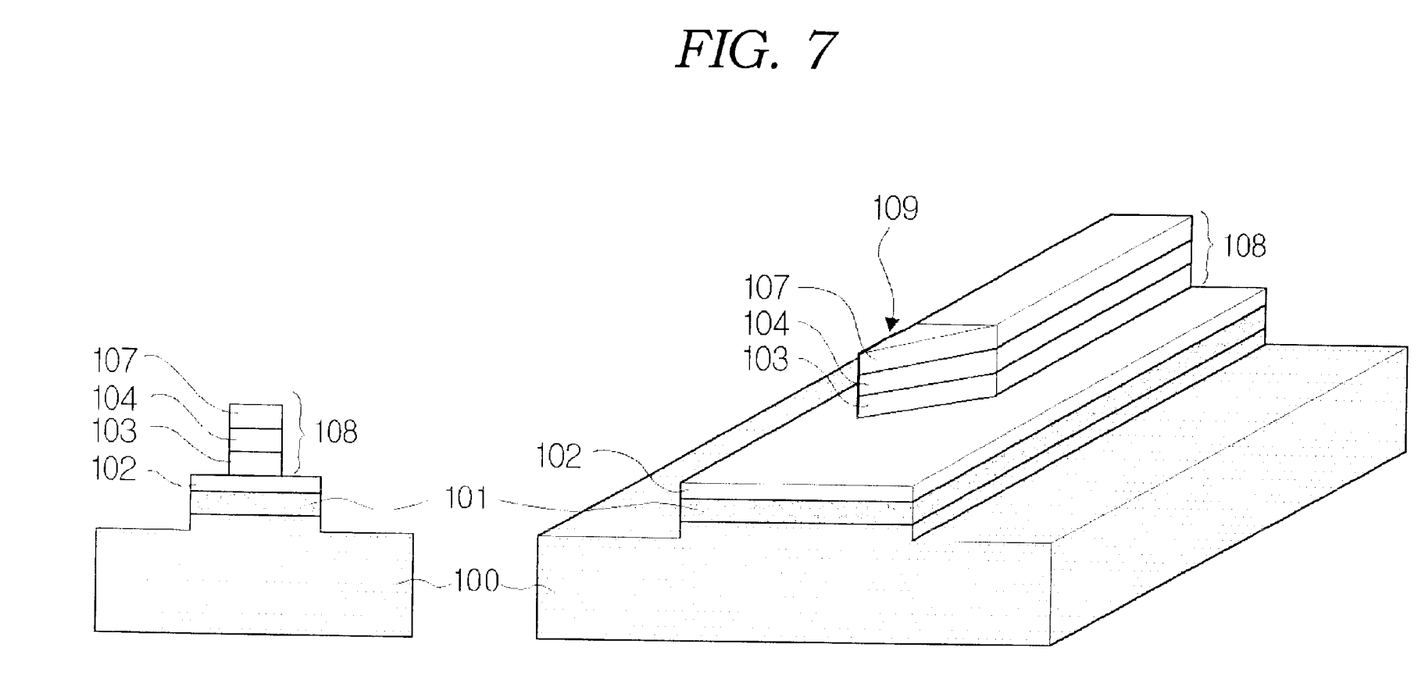
FIG. 7 illustrates a process of fabricating a spot size converter according to the present invention.

Then, in a fourth step as illustrated in FIG. 7, an output optical waveguide and a unidirectional side-tapered optical waveguide are formed using thus formed mask 107 and the etched InGaAsP (Q=1.3) layer 103. First, the InGaAsP (Q=1.18) layer 101 and the spacer layer 102 are respectively etched from the partially etched area of the InGaAsP (Q=1.3) layer 103 to form the partially etched portion of the InGaAsP (Q=1.18) layer 101 having a width corresponding to the desired width of the input optical waveguide. Thus, the stricture of the input optical waveguide consisting of the remaining portion of the InGaAsP (Q=1.18) layer 101 and the spacer layer 102 is formed. Next, the spacer layer 104 and the InGaAsP (Q=1.3) layer 103 are further etched using the mask 107 to form an output optical wave guide 108 and a unidirectional side-tapered optical waveguide 109.

Figure 8:
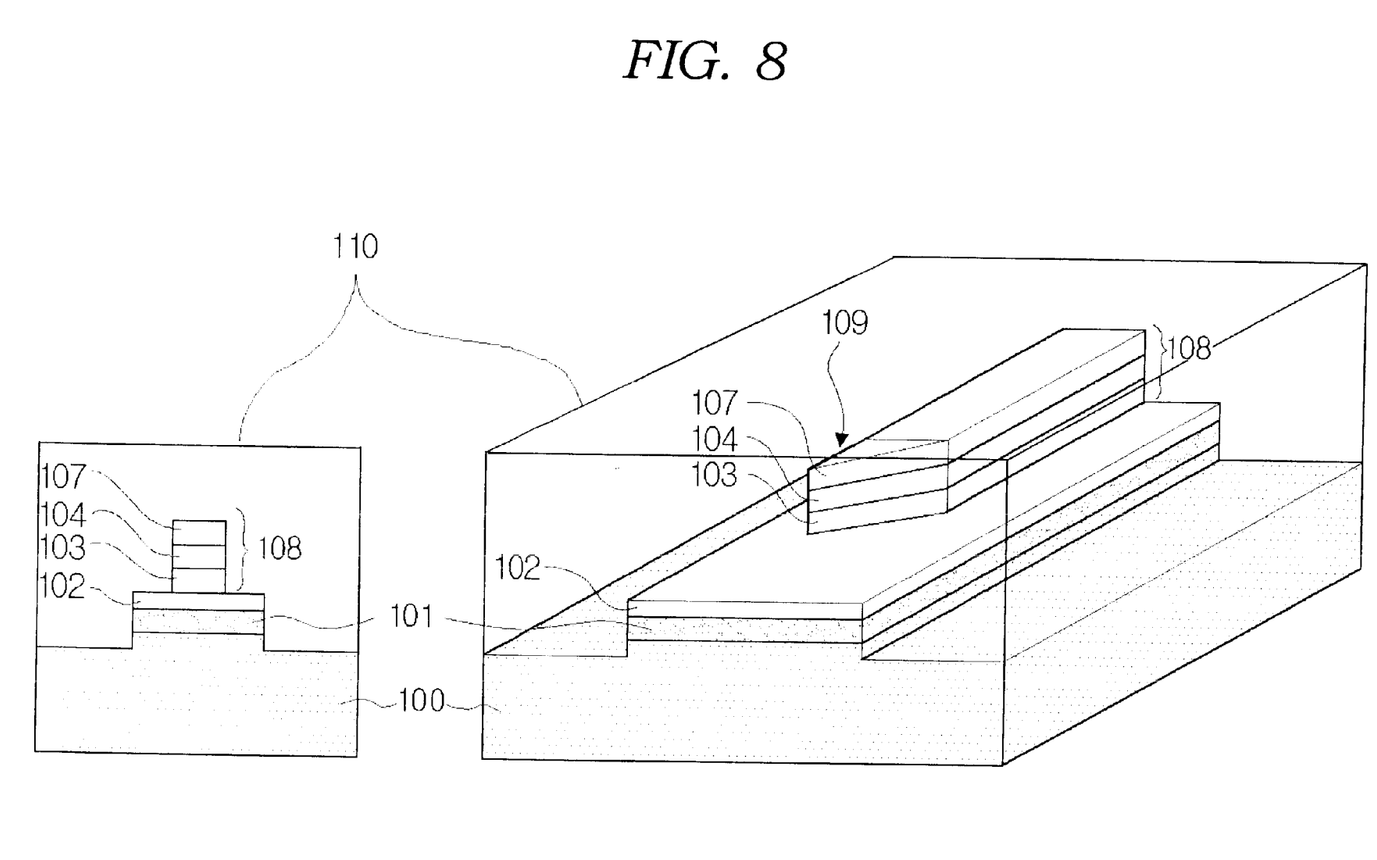
FIG. 8 is a 3D structure of a spot size converter on which a clad layer is grown.

Finally, in a fifth step as illustrated in FIG. 8, a clad layer 110 is formed on the semiconductor substrate to surround the optical waveguides except for the portion where optical signal is inputted or outputted. FIG. 8 is a 3D structure of the spot size converter with a clad layer thus formed.

When a spot size converter is exposed to the atmosphere, multiple spots are formed due to the contact with air, and this obstructs the normal function of the device. Therefore, as one of the methods implementing a single mode spot size converter the clad layer 110 of InP is grown to surround the spot size converter structure.

Figure 9:
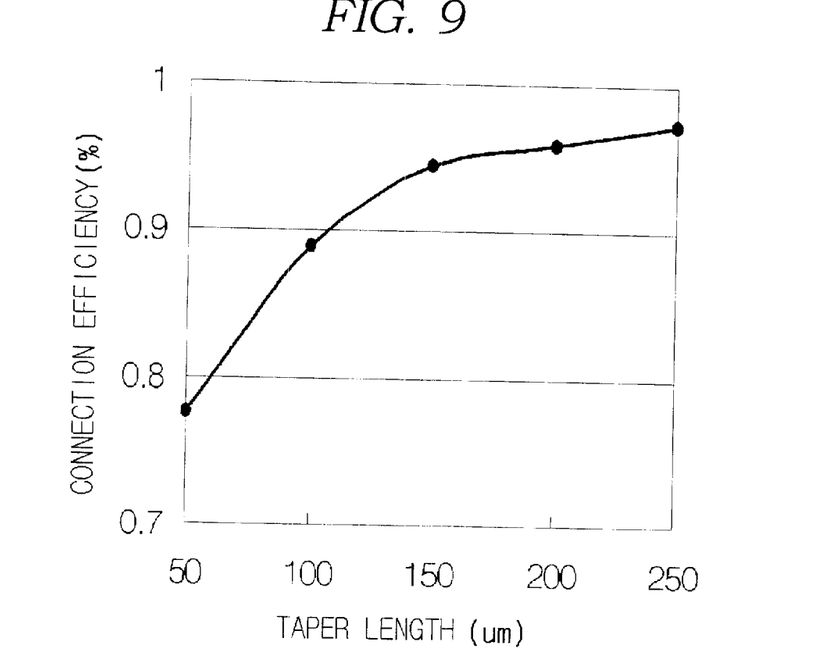
FIG. 9 is a graph showing the variation of the coupling efficiency of a unidirectional side-tapered optical waveguide according to the taper length.

In the completed spot size converter according to the present invention, the coupling efficiency of the spot size converter varies depending the length (T) of the tapered portion and the offset between the input and output optical waveguides as shown below. FIG. 9 is a graph showing the variation in the length of the tapered portion against the coupling efficiency of the unidirectional side-tapered optical waveguide.

In FIG. 9, as in shown in FIG. 1, the widths ($w_{in}$, $w_{out}$) of the input and output optical waveguides are 3.0 μm and 1.2 μm, respectively. The thickness ($d_{in}$, $d_{out}$) of the input and output optical waveguides are 0.15 μm and 0.4 μm, respectively. The distance (g) between the input optical waveguide and the output optical waveguide is 0.3 μm. Passive-type and active-type reflective indices ($n_{in}$, $n_{out}$) are 3.28 and 3.4, respectively. Also, a clad reflective index ($n_0$) is 3.17.

A simulated result by 3D BPM of the spot size converter having the above parameters shows a high coupling efficiency of over 90% when the length (T) of the tapered portion is over 150 μm, as shown in FIG. 9.

Figure 10:
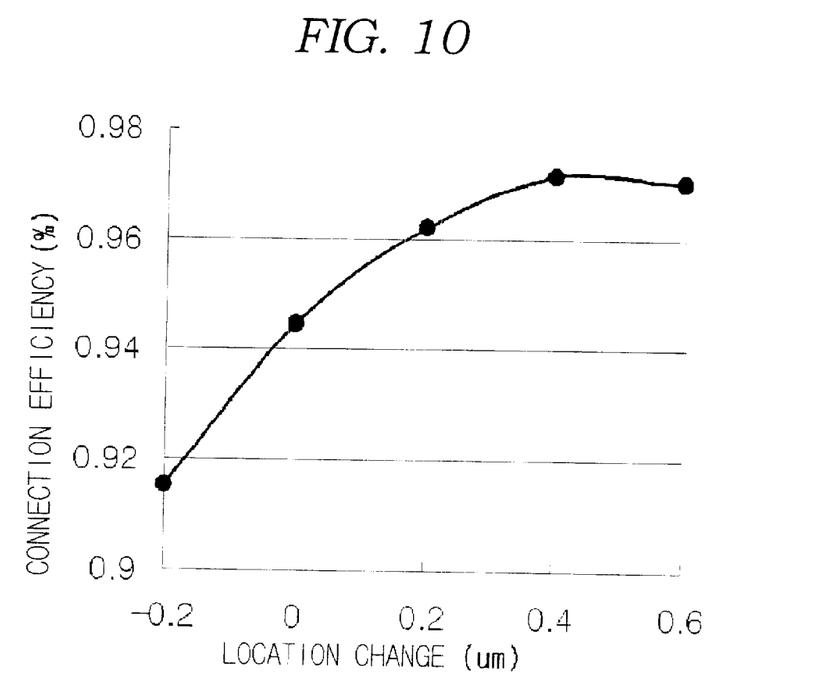
FIG. 10 is a graph showing the coupling efficiency according to the variation in the locations of the input and output optical waveguides.

FIG. 10 is a graph showing the variation in the coupling efficiency depending on the change in the locations of the input and output optical waveguides. As shown in FIG. 10, in a spot size converter having the physical structure with the same parameters as mentioned referring to FIG. 9 and having a tapered portion with a length of at least 150 μm, the coupling efficiency increases as the tip of the tapered portion of the output optical waveguide approaches the center of the input optical waveguide.

As mentioned above, the present invention employs a unidirectional side-tapered optical waveguide for connecting an input optical waveguide and an output optical waveguide, both of which are integrated to form a vertical double-layer structure. Therefore, the present invention has an outstanding advantage that the coupling loss and the reflection loss generated between the optical fiber and the optical waveguide integrated devices are eliminated or minimized. In particular, the present invention can easily manufacture a narrow tapered optical waveguide structure having a width less than several tens of Å using a low-resolution photolithography technology. Thus, the prevent invention can reduce the manufacturing time and cost and improve the manufacturing yield of the spot size converter at the same time.

The present invention has been described with reference to a particular embodiment in connection with a particular application. Those having ordinary skill in the art and access to the teachings of the present invention will recognize additional modifications and applications within the scope thereof.

It is therefore intended by the appended claims to cover any and all such applications, modifications, and embodiments within the scope of the present invention.

What is claimed is:

1. A spot size converter for converting the spot size of input optical signal received from an input optical fiber and outputting the converted optical signal, said spot size converter comprising:

an input optical waveguide formed on a semiconductor substrate and connected to said input optical fiber to receive input optical signal;

an output optical waveguide formed on said input optical waveguide to form a double-layer structure with said input optical waveguide on said semiconductor substrate and to output the optical signal after converting the spot size of the optical signal; and a unidirectional side-tapered optical waveguide formed in the same layer as said output optical waveguide and integrated to one side of said output optical waveguide near to said input optical fiber, and having a shape tapered in one side along a given length in the longitudinal direction of said output optical waveguide, wherein the spot size of the input optical signal transferred from said input optical waveguide to said unidirectional side-tapered optical waveguide is gradually converted while the optical signal travels through the unidirectional side-tapered optical waveguide toward the output optical waveguide due to the change in the effective reflective index.

2. The spot size converter according to claim 1, wherein said input optical waveguide and said output optical waveguide containing InGaAsP.

3. The spot size converter according to claim 1, wherein the light reflective index of the said output optical waveguide is greater than that of said input optical waveguide.

4. The spot size converter according to claim 1, wherein a spacer layer made of InP is positioned between the layers of said input optical waveguide and said output optical waveguide.

5. The spot size converter according to claim 2, further comprising a clad layer surrounding the spot size converter structure excluding the portions where the optical signal is input or output.

6. A method of fabricating a spot size converter, the method comprising the steps of:
   (a) sequentially forming a first semiconductor layer for forming an input optical waveguide, and a second semiconductor layer for forming a unidirectional side-tapered optical waveguide and an output optical waveguide on a semiconductor substrate;
   (b) etching said second semiconductor layer so that said second semiconductor layer has a width corresponding to a desired width of said input optical waveguide;
   (c) forming a mask on said second semiconductor layer, said mask having a width corresponding to a desired width of said output optical waveguide and having a tapered portion on one end, said tapered portion having a shape one side of which is tapered along a given length in the longitudinal direction of said output optical waveguide to correspond to a desired shape of the unidirectional side-tapered optical waveguide; and
   (d) respectively etching said second semiconductor layer and said first semiconductor layer using said mask and said second semiconductor layer as a mask.

7. The method of fabricating a spot size converter according to claim 6, wherein said step (c) includes the steps of:
   forming a first mask having a tapered portion on one end;
   forming a second mask having a width same as the desired width of said output optical waveguide on said first mask; and,
   etching said first mask using said second mask.

8. The method of fabricating a spot size converter according to claim 6, the method further including step of growing a clad layer surrounding the spot size converter structure excluding the portions where the optical signal is input or output.

9. The method of fabricating a spot size converter according to claim 6, said method further including a step of forming a spacer layer over said first semiconductor layer.

10. The method of fabricating a spot size converter according to claim 9, wherein the reflective index of said spacer layer is lower than that of said input and output optical waveguides and has a selective etching characteristic.

11. The method of fabricating a spot size converter according to claim 10, wherein said spacer layer is made of InP.

* * * * *